XR 1,865,858
Search Room
(2)

July 5, 1932. A. HUND 1,865,858

PIEZO ELECTRIC CRYSTAL SYSTEM

Filed April 29, 1929

Inventor:
August Hund
by John B. Brady
his Attorney

[stamp] ...ATION, 327 Search Room

Patented July 5, 1932

1,865,858

UNITED STATES PATENT OFFICE

AUGUST HUND, OF BETHESDA, MARYLAND

PIEZO ELECTRIC CRYSTAL SYSTEM

Application filed April 29, 1929. Serial No. 359,113.

My invention relates broadly to high frequency oscillators and more particularly to a piezo electric crystal controlled oscillator system.

One of the objects of my invention is to provide a piezo electric crystal oscillator system in which the capacity effects of the electrodes associated with the piezo electric element of crystalline quartz may be reduced to a minimum for obtaining constant frequency oscillations in an electrical system controlled accurately by the frequency characteristics of the piezo electric crystal element.

Another object of my invention is to provide a system for producing oscillations in an electrical system under control of a piezo electric crystal element in which a composite oscillation along a multiplicity of axes of the piezo crystal is developed in the piezo electric crystal for producing constant frequency control in an associated electrical circuit.

Figure 1:
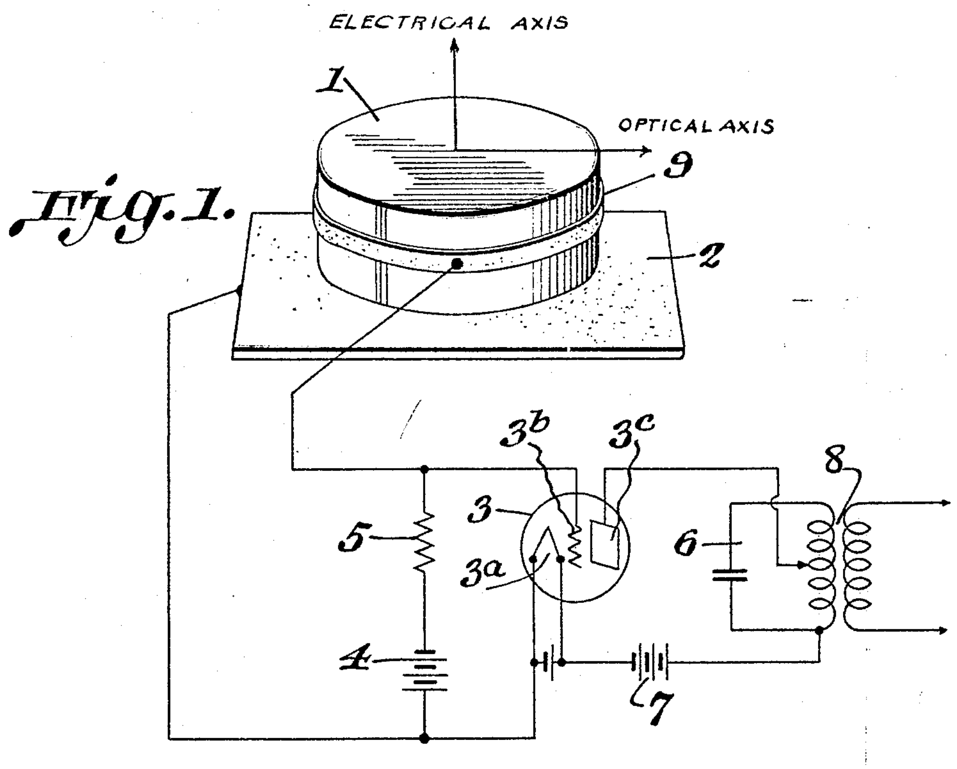
Figure 2:
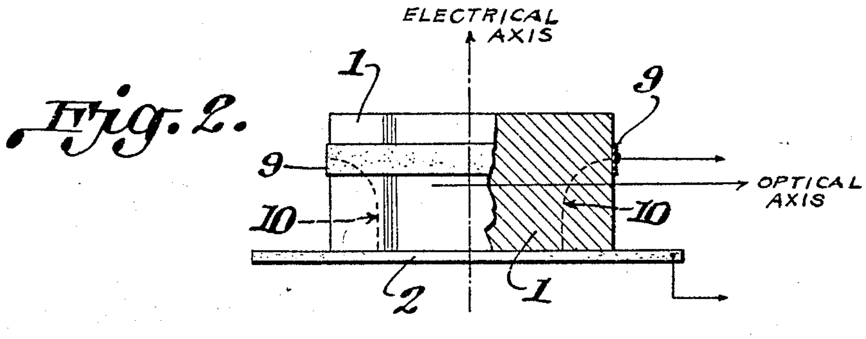

Other and further objects of my invention reside in the construction and arrangement of mounting for piezo electric crystals for obtaining oscillations as set forth more clearly in the specification hereinafter following by reference to the accompanying drawing, in which:

Figure 1 diagrammatically illustrates a piezo electric crystal system embodying the principles of my invention; and Fig. 2 is a side elevation of a piezo electric crystal arranged in accordance with my invention where the crystal is shown partially in side elevation and partially broken away and illustrated in section.

I have discovered that a high degree of constancy in the frequency characteristic of energy generated by a piezo electric crystal system may be secured when the capacity effects of the electrodes by which the piezo electric crystal element is connected in the oscillator system are reduced to a minimum. I have further discovered that by setting up oscillations in a piezo electric crystal system which have components along several axes in the crystal system, that a frequency characteristic of a high degree of constancy may be obtained. In the piezo electric crystal system of my invention, I establish connection with the opposite sides of the oscillatory circuit to which the piezo electric crystal element is connected by a connection between one face of the crystal and a connection to the sides of the crystal. The piezo electric effect takes place between the connection on the exterior cylindrical surface of the piezo electric crystal element and one face of the piezo electric crystal element, thus reducing the capacity of the crystal mounting to a minimum.

Referring to the drawing in more detail, the piezo electric crystal element is indicated by reference character 1 having one face thereof resting in contact with contact plate 2 which connects to one side of the high frequency oscillator system which may include electron tube 3 containing cathode 3*a*, control member 3*b* and plate electrode 3*c*. Suitable means may be provided for controlling the potential of the control member 3*b* such as potential source 4 operating through high resistance path 5. The output of the oscillatory circuit may include tuned circuit 6 and source of potential 7, the oscillations being transferred to the coupled circuit 8. Connection is made between the control electrode 3*b* of the piezo electric crystal element and the piezo electric crystal element 1 by means of a band member 9 which may be of copper or other metallic material which loosely encircles the exterior surface of the sides of the crystal element 1. The band 9 is made of small dimensions to reduce the capacity effects between electrodes to a minimum. The energy which is transferred to the electron tube oscillator circuit takes the path indicated by dotted lines 10. The electrostatic lines therefore proceed along different components, one of which is parallel to the axis of the cylinder, and the other of which is substantially at right angles to the optical axis of the crystal and along one of the piezo electric axes.

I have found that the electric oscillations thus developed have the characteristic of extreme constancy in frequency and thereby enable an electron tube oscillator system to be controlled according to the crystal frequency and independent of circuit characteristics and free of capacity effects which normally tend to introduce inaccuracies in the frequency of the oscillations developed by the crystal control system.

The position of the ring member 9 which encircles the perimeter or periphery of the piezo electric crystal element 1 with respect to the plate member 2, is selected to provide such spacial relationship as may be required in securing operation of the oscillatory system at a predetermined selected frequency. The ring member 9 may be adjusted in position along the surface of the sides of the piezo electric crystal element 1 until that position is reached at which oscillations of the desired frequency are sustained in the oscillatory system.

While I have described the piezo electric crystal system of my invention, in one of its preferred embodiments, I desire that it be understood that modifications may be made and that no limitations upon my invention are intended other than are imposed by the scope of the appended claims.

What I claim as new and desire to secure by Letters Patent of the United States is as follows:

1. Means for establishing electrical connection with a piezo electric crystal element having the electrical axis coincident with the geometrical axis thereof with the optical axis extending normal thereto comprising a plate contacting with one face of said piezo electric crystal element and a member encircling the periphery of said piezo electric crystal element in a plane parallel to the optical axis of said crystal element.

2. Means establishing connection with a piezo electric crystal element having the electrical axis thereof coincident with the geometrical axis with the optical axis extending normal thereto comprising a pair of electrodes, one of said electrodes establishing connection with one face of said piezo electric crystal element, and the other of said electrodes establishing connection with the periphery of said piezo electric crystal element in a plane parallel to the optical axis of said piezo electric crystal element.

3. Means for establishing electrical connection with a piezo electric crystal element having the electrical axis thereof coincident with the geometrical axis and having the optical axis extending normal thereto comprising a plate electrode connected with one face of said crystal element and a ring member encircling the periphery of said crystal element and positioned in the path of piezo electric effects extending substantially parallel to the optical axis of said piezo electric crystal element and substantially at an angle thereto.

4. Means for establishing electrical connection with a piezo electric crystal element having the electrical axis thereof coincident with the geometrical axis with the optical axis extending normal thereto including a plate member contacting with one face of said piezo electric crystal element, and a conductive band of small electrical capacity engaging the periphery of said piezo electric crystal element in a plane parallel to the optical axis of said piezo electric crystal element.

5. A mounting for a cylindrical shaped piezo electric crystal element having an axially extending electrical axis and a radially extending optical axis, including connections for said piezo electric crystal element comprising a plate member contacting with one face of said piezo electric crystal element, and a loose fitting ring-like member encircling the cylindrical surface of said piezo electric crystal element in a plane parallel to the optical axis of said piezo electric crystal element.

6. A mounting for a piezo electric crystal element having the electrical axis thereof coincident with the geometrical axis and the optical axis extending at right angles thereto, including electrodes constituting a plate member contacting with one face of said piezo electric crystal element, a conductive ring-like member encircling the periphery of said piezo electric crystal element in a position removed from the aforementioned face of said piezo electric crystal element in a plane substantially parallel to the optical axis of said piezo electric crystal element, and terminal connections extending from said plate member and said ring-like member.

7. A mounting for a piezo electric crystal element having the electrical axis thereof extending normal to the faces of the crystal and the optical axis electrically parallel to the faces of the crystal comprising a plate member establishing a connection with one face of said piezo electric crystal element, a member encircling the periphery of said piezo electric crystal element and said member being positioned remote from the faces of said piezo electric crystal element in a plane substantially parallel with the optical axis of said piezo electric crystal for establishing paths for the passage of piezo electric currents through said piezo electric crystal element along separate components of the axes of said element.

8. A piezo electric crystal assembly comprising a circular piezo electric crystal element having a cylindrical surface with the electrical axis extending axially and its optical axis extending diametrically, a conductive plate adapted to establish electrical connection with one end of the circular piezo electric crystal element and a conductive belt of small electrical capacity extending around the cylindrical surface of said piezo electric crystal element and establishing electrical connection therewith in a plane parallel with the optical axis of said element.

9. A piezo electric crystal assembly comprising a circular piezo electric crystal element having a cylindrical surface with the electrical axis extending axially and its optical axis extending diametrically, a conductive plate adapted to establish electrical connection with one face of the circular piezo electric crystal element and a conductive belt extending around the cylindrical surface of said piezo electric crystal element and establishing electrical connection therewith in a plane parallel with the optical axis of said element, said belt having a width substantially less than one-half the thickness of said piezo electric crystal element.

In testimony whereof I affix my signature.

AUGUST HUND.